United States Patent
Wang et al.

(10) Patent No.: US 10,770,745 B2
(45) Date of Patent: Sep. 8, 2020

(54) MONOLITHICALLY INTEGRATED THIN-FILM SOLID STATE LITHIUM BATTERY DEVICE HAVING MULTIPLE LAYERS OF LITHIUM ELECTROCHEMICAL CELLS

(75) Inventors: Chia-Wei Wang, Ypsilanti, MI (US); Marc Langlois, Ann Arbor, MI (US); Hyoncheol Kim, Ann Arbor, MI (US); Myoungdo Chung, Ann Arbor, MI (US); Steve Buckingham, Ann Arbor, MI (US); Ann Marie Sastry, Ann Arbor, MI (US)

(73) Assignee: Sakti3, Inc., Ann Arbor, MI (US)

( * ) Notice: Subject to any disclaimer, the term of this patent is extended or adjusted under 35 U.S.C. 154(b) by 0 days.

(21) Appl. No.: 13/292,663

(22) Filed: Nov. 9, 2011

(65) Prior Publication Data

US 2012/0058380 A1     Mar. 8, 2012

(51) Int. Cl.
| | |
|---|---|
| *H01M 10/05* | (2010.01) |
| *H01M 4/13* | (2010.01) |
| *H01M 10/052* | (2010.01) |
| *H01M 4/04* | (2006.01) |
| *H01M 4/139* | (2010.01) |

(52) U.S. Cl.
CPC ....... *H01M 10/052* (2013.01); *H01M 4/0423* (2013.01); *H01M 4/13* (2013.01); *H01M 4/139* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 2,862,646 A | 12/1958 | Hayford et al. |
| 4,009,052 A | 2/1977 | Whittingham |
| 4,648,347 A | 3/1987 | Aichert et al. |
| 4,854,264 A | 8/1989 | Noma et al. |
| 4,933,889 A | 6/1990 | Meshkat et al. |
| 5,338,625 A | 8/1994 | Bates et al. |
| 5,367,465 A | 11/1994 | Tazawa et al. |
| 5,377,118 A | 12/1994 | Leon et al. |

(Continued)

OTHER PUBLICATIONS

International Search Report and Written Opinion of PCT Application No. PCT/US09/47848 filed on Jun. 18, 2009.

(Continued)

*Primary Examiner* — Barbara L Gilliam
*Assistant Examiner* — Angela J Martin
(74) *Attorney, Agent, or Firm* — Morrison & Foerster LLP

(57) ABSTRACT

A monolithically integrated thin-film solid-state lithium battery device to supply energy to a mobile communication device. The battery device comprises multiple layers ranging from greater than 100 layers to less than 20,000 layers of lithium electrochemical cells. The lithium electrochemical cells are connected in parallel or in series to conform to a spatial volume. The device is substantially free from a substrate member. The overlying multiple layers are free from any intermediary substrate member. The multiple layers are configured to form a plurality of electrochemical cells configured in a parallel arrangement or a serial arrangement using either a self terminated or post terminated connector configuration.

23 Claims, 15 Drawing Sheets

(56) References Cited

U.S. PATENT DOCUMENTS

| | | | |
|---|---|---|---|
| 5,402,366 A | 3/1995 | Kihara et al. | |
| 5,411,592 A | 5/1995 | Ovshinsky et al. | |
| 5,453,934 A | 9/1995 | Taghavi et al. | |
| 5,498,489 A | 3/1996 | Dasgupta et al. | |
| 5,571,749 A | 11/1996 | Matsuda et al. | |
| 5,751,591 A | 5/1998 | Asada | |
| 5,906,757 A | 5/1999 | Kong et al. | |
| 6,016,047 A | 1/2000 | Notten et al. | |
| 6,294,479 B1 | 9/2001 | Ebe et al. | |
| 6,350,222 B2 | 2/2002 | Susnjara | |
| 6,376,123 B1* | 4/2002 | Chu | H01M 4/04 429/104 |
| 6,402,443 B1 | 6/2002 | Hoppe | |
| 6,656,234 B2 | 12/2003 | Dexter et al. | |
| 6,884,333 B2 | 4/2005 | Landau | |
| 6,924,164 B2 | 8/2005 | Jenson | |
| 6,962,823 B2 | 11/2005 | Empedocles et al. | |
| 6,982,132 B1 | 1/2006 | Goldner et al. | |
| 7,107,193 B1 | 9/2006 | Hummel et al. | |
| 7,194,801 B2 | 3/2007 | Jenson et al. | |
| 7,294,209 B2 | 11/2007 | Shakespeare | |
| 7,315,789 B2 | 1/2008 | Plett | |
| 7,361,327 B2 | 4/2008 | Tumas et al. | |
| 7,490,710 B1 | 2/2009 | Weskamp et al. | |
| 7,553,584 B2 | 6/2009 | Chiang et al. | |
| 7,579,112 B2 | 8/2009 | Chiang et al. | |
| 7,618,742 B2 | 11/2009 | Kaplin et al. | |
| 7,625,198 B2 | 12/2009 | Lipson et al. | |
| 7,945,344 B2 | 5/2011 | Wang et al. | |
| 8,168,326 B2* | 5/2012 | Chiang et al. | 429/209 |
| 2002/0041997 A1* | 4/2002 | Muffoletto | H01G 9/04 429/218.1 |
| 2002/0120906 A1 | 8/2002 | Xia et al. | |
| 2002/0169620 A1 | 11/2002 | Spotnitz et al. | |
| 2003/0064292 A1 | 4/2003 | Neudecker et al. | |
| 2003/0068559 A1* | 4/2003 | Armstrong et al. | 429/234 |
| 2003/0082446 A1 | 5/2003 | Chiang et al. | |
| 2003/0099884 A1 | 5/2003 | Chiang et al. | |
| 2003/0108800 A1 | 6/2003 | Barbarich | |
| 2004/0048157 A1* | 3/2004 | Neudecker | H01M 4/0421 429/231.2 |
| 2004/0131761 A1 | 7/2004 | Shakespeare | |
| 2004/0131937 A1 | 7/2004 | Chen et al. | |
| 2004/0144321 A1 | 7/2004 | Grace et al. | |
| 2004/0151985 A1 | 8/2004 | Munshi | |
| 2004/0258851 A1 | 12/2004 | Selvamanickam et al. | |
| 2005/0114105 A1 | 5/2005 | Barber | |
| 2005/0244580 A1 | 11/2005 | Cok et al. | |
| 2006/0138350 A1 | 6/2006 | Banine et al. | |
| 2006/0156978 A1 | 7/2006 | Lipson et al. | |
| 2007/0110892 A1 | 5/2007 | Awata et al. | |
| 2007/0218329 A1 | 9/2007 | Keith et al. | |
| 2008/0050656 A1* | 2/2008 | Eisenbeiser | H01M 2/0267 429/241 |
| 2008/0118782 A1 | 5/2008 | Heller et al. | |
| 2008/0187832 A1 | 8/2008 | Takezawa et al. | |
| 2009/0061090 A1 | 3/2009 | Negishi | |
| 2009/0157369 A1 | 6/2009 | Li et al. | |
| 2009/0217876 A1 | 9/2009 | Epstein | |
| 2009/0304906 A1 | 12/2009 | Suduo et al. | |
| 2009/0326696 A1 | 12/2009 | Wang et al. | |
| 2010/0015361 A1 | 1/2010 | Negishi | |
| 2010/0035152 A1 | 2/2010 | Sastry et al. | |
| 2010/0082142 A1 | 4/2010 | Usadi et al. | |
| 2010/0190051 A1* | 7/2010 | Aitken et al. | 429/162 |
| 2010/0330411 A1* | 12/2010 | Nam | H01M 2/08 429/156 |
| 2011/0076567 A1* | 3/2011 | Bouillon | H01M 4/0423 429/246 |
| 2011/0165326 A1 | 7/2011 | Little et al. | |
| 2011/0183183 A1* | 7/2011 | Grady | H01M 2/1022 429/152 |
| 2011/0200868 A1* | 8/2011 | Klaassen | H01M 4/13 429/163 |
| 2011/0202159 A1 | 8/2011 | Wang et al. | |
| 2011/0217578 A1* | 9/2011 | Albano et al. | 429/94 |
| 2011/0301931 A1 | 12/2011 | Gering | |
| 2012/0040233 A1* | 2/2012 | Kim et al. | 429/152 |
| 2012/0058280 A1* | 3/2012 | Chung et al. | 427/551 |
| 2012/0270114 A1* | 10/2012 | Reynolds | H01M 4/0426 429/322 |

OTHER PUBLICATIONS

Salvador Aceves et al., "Computer Modeling in the Design and Evaluation of Electric and Hybrid Vehicles", 11th Annual National Educator's Workshop Standard Experiments in Engineering Materials, Science, and Technology, Oct. 27-30, 1996, 12 pages retrieved from the Internet: <<http://www.osti.gov/bridge/servlets/purl/381678-Unwv9F/webviewable/381678.pdf>>, Lawrence Livermore National Laboratory, Los Alamos, New Mexico.

Y. H. Chen et al., "Selection of Conductive Additives in Li-Ion Battery Cathodes: A Numerical Study", Journal of the Electrochemical Society, 2007, pp. A978-A986, vol. 154 No. 10, The Electrochemical Society.

Chia-Wei Wang et al., "Mesoscale Modeling of a Li-Ion Polymer Cell," Journal of the Electrochemical Society, 2007, pp. A1035-A1047, vol. 154 No. 11, The Electrochemical Society.

Marc Doyle et al., "Computer Simulations of a Lithium-Ion Polymer Battery and Implications for Higher Capacity Next-Generation Battery Designs", Journal of the Electrochemical Society, 2003, pp. A706-A713, vol. 150 No. 6, The Electrochemical Society.

Gerbrand Ceder et al., "Computational Modeling and Simulation for Rechargeable Batteries", MRS Bulletin, Aug. 2002, pp. 619-623.

International Search Report and Written Opinion of PCT Application No. PCT/US09/47846 filed on Jun. 18, 2009.

European Search Report for PCT/US2009/047848 dated Oct. 11, 2012.

Q.H. Zeng et al, "Multiscale modeling and simulation of polymer nanocomposites", Progress in Polymer Science, Dec. 3, 2007, pp. 191-269, vol. 33, No. 2, Pergamon Press, Oxford, Great Britain.

Examination Report dated Dec. 3, 2018, directed to IN Application No. 3492/DEL/2012; 6 pages.

* cited by examiner

MONOLITHICALLY INTEGRATED THIN-FILM SOLID STATE LITHIUM BATTERY DEVICE HAVING MULTIPLE LAYERS OF LITHIUM ELECTROCHEMICAL CELLS

CROSS-REFERENCES TO RELATED APPLICATIONS

The present application incorporates by reference, for all purposes, the following issued patent: U.S. Pat. No. 7,945,344, filed Jun. 15, 2009.

BACKGROUND OF THE INVENTION

This present invention relates to the manufacture of an integrated solid-state electrochemical cell. More particularly, the present invention provides a device and method for fabricating a solid-state thin film battery device. Merely by way of example, the invention has been provided with use of lithium based cells. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, wherein additional power is provided by a fuel cell, other battery, internal combustion (IC) engine or other combustion device, capacitor, solar cell, etc.

Common electro-chemical cells often use liquid electrolytes. Such cells are typically used in many conventional applications. Alternative techniques for manufacturing electro-chemical cells include solid state cells. Such solid state cells are generally in the experimental state, have been difficult to make, and have not been successfully produced in large scale. Although promising, solid state cells have not been achieved due to limitations in cell structures and manufacturing techniques. These and other limitations have been described throughout the present specification and more particularly below.

Solid state batteries have been proven to have several advantages over conventional batteries using liquid electrolytes in lab settings. Safety is the foremost one. A solid state battery is intrinsically more stable than batteries based on liquid electrolyte cells, since it does not contain a liquid that causes undesirable reactions, which can result thermal runaway, and an explosion in the worst case. Solid state batteries can store more energy for the same volume or same mass compared to conventional batteries. Good cycle performance, more than 10,000 cycles, and good high temperature stability also has been reported.

Despite of these outstanding properties of solid state batteries, there are challenges to address in the future to make this type of batteries available in the market. To exploit the compactness and high energy density, packaging of such batteries should be improved. To be used in variety of applications such as consumer electronics or electric vehicle, other than the current application, radio frequency identification (RFID), large area and fast film deposition techniques at low cost should be developed.

From the above, it is seen that techniques for improving solid-state cells are highly desirable.

BRIEF SUMMARY OF THE INVENTION

According to the present invention, techniques related to the manufacture of electrochemical cells are provided. More particularly, the present invention provides a device and method for fabricating a solid state thin film battery device. Merely by way of example, the invention has been provided with use of lithium based cells. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, wherein additional power is provided by a fuel cell, other battery, IC engine or other combustion device, capacitor, solar cell, etc.

In a preferred embodiment, the present method and battery cell uses specific process and design parameters. These parameters can be determined through numerical techniques using selected upper and lower bounds to achieve desirable results for certain applications. As an example, such numerical techniques included those described in a pioneering approach described in U.S. Pat. No. 7,945,344 issued May 17, 2011, which is hereby incorporated by reference, and commonly assigned. In a preferred embodiment, the present battery structure used information from the techniques described in the aforementioned U.S. patent.

In a preferred embodiment, the present invention provides a method and device using a prismatic multilayer structure with post or self terminated current collectors conforming to a viable volume having >20% increase in energy density over 280 Watt-hour/Kilogram, as referenced to conventional battery technology. As used herein, the term prismatic is consistent with a definition known to one of ordinary skill in the art, although there may be some slight variations. In a specific embodiment, the method and device includes a multilayer structure comprised of >100 and <3000 cells in parallel conforming to energy density optimization calculations. Some results of this construction are shown in FIG. 1 containing the graph of cathode thickness versus energy density for a range of ionic and electronic conductivities. In a specific embodiment, the multilayer structure comprises cathode layers having layer thicknesses between about 0.2 and about 2.0 microns conforming to a 7.2 cm×3.2 cm×0.5 cm prismatic pouch cell, as an example. Of course, there can be other variations, modifications, and alternatives.

In a preferred embodiment, a monolithically integrated thin-film solid-state lithium battery device comprises multiple layers of lithium electrochemical cells. The lithium electrochemical cell is the smallest unit in the thin-film solid-state lithium battery that can provide electron energy and, in a specific embodiment, each cell is characterized by a spatial region of less than 100 centimeter squared. The preferred thickness of each layer in the electrochemical cell is obtained by a numerical method.

In a preferred embodiment, the single lithium electrochemical cell comprises layers deposited by physical vapor deposition processes in the sequence of a cathode barrier, cathode current collector, cathode, electrolyte, anode, anode current collector, and anode barrier overlying a substrate. In a specific embodiment, the substrate layer in the thin-film solid-state electrochemical cell device provides the mechanical support for the following layers. Therefore, its stiffness has to sustain the induced weight and stresses due to the following deposited layers thereon. In an embodiment, thin polymers, especially those like polyethylene terephthalate (PET), are used as substrates that have a thickness of less than 10 microns. In another embodiment, metalized PET, which a very thin layer (e.g., 0.1 microns) of copper is coated above the PET, is used to prevent the oxygen and moisture of the substrate from diffusing into the cathode and cathode current collector. The thickness of the metalized metal on the PET is on the order of Angstroms of a meter.

In a preferred embodiment, the cathode barrier layer between the substrate and cathode current collector of electrochemical cell device is used to inhibit the reaction of lithium with the moisture inside substrate. An oxide, nitride, or phosphate of metal is preferable for this layer. The metal type comes from the Groups 4, 10, 11, 13 and 14 of the periodic table. The thickness of this layer is on the order of 0.1 microns or less. In another preferred embodiment, lithium phosphate ($Li_xPO_y$, where x+y<=7) is used as cathode barrier.

In another preferred embodiment, the cathode and anode current collectors in the electrochemical cell device are necessary to collect and transport the electron current from the cathode and anode toward the external load. The electrical conductivity is on the order of $10^7$ S/m or higher. The cathode and the anode current collector are made of a conductive metal selected from an element in Groups 10, 11, and 13 of the periodic table or wherein the cathode and the anode current collector are made of a copper material with electronic conductivity higher than $10^7$ S/m. The cathode and anode current collectors need to be chemically stable at the voltage at which they are operated. In an embodiment, the thickness of the current collector is between about 0.1 and about 2 microns.

In preferred embodiment, a cathode electrode material comprises an amorphous or crystalline lithiated transition metal oxide and lithiated transition metal phosphate, wherein the metal comes Groups 3 to 12 of the periodic table. Preferably, the cathode electrode material comprises amorphous lithiated vanadium based oxide with electrical conductivity ranging from $10^{-6}$ to $10^{-2}$ S/m (preferably less than $10^{-3}$ S/m), and ionic diffusivity ranging $1\times10^{-16}$ to $1\times10^{-14}$ m²/s. The vanadium based oxide overlies the electrically conductive layer, the cathode electrode material being characterized with a layer thickness between about 0.2 and about 2 micrometers. The electrical conductivity can be adjusted by the process condition.

In a specific embodiment, the solid-state glassy electrolyte of this electrochemical cell device comprises amorphous lithiated oxynitride phosphorus with ionic conductivity ranging from $10^{-5}$ to $10^{-4}$ S/m. The ionic conductivity of glassy electrolyte can be tuned by the nitrogen concentration and evaporation process conditions. This glassy electrolyte material can be configured as an electrolyte overlying the cathode electrode material. This glassy electrolyte material is capable of shuttling lithium ions during a charge process and a discharge process, and is characterized with layer thickness between about 0.1 and about 1 micrometers.

In a specific embodiment, a solid-state layer of negative electrode material configured as an anode in this device is capable of electrochemically inserting lithium into the host lattice or plating of Li-ions during a charge process and a discharge process. This solid-state anode layer can have layer thickness between about 0.2 and about 3 micrometers. The layer thickness of the anode can be several times the size of cathode layer thickness so that it could ensure enough lithium concentration for shuttling back and forth between cathode and anode through electrolyte.

In a preferred embodiment, the anode barrier layer overlies the anode current collector in this device. This anode barrier layer is used to inhibit the reaction of lithium with the moisture external air. An oxide, nitride, or phosphate of metal is preferable for the material used in this layer. Such metals come from Groups 4, 10, 11, 13 and 14 of the periodic table. These metal oxides, metal nitrides, or metal phosphates are easy to evaporate and deposited. In this method and structure, the thickness of this layer is on the order of 0.1 microns or less. In one preferred embodiment, the lithium phosphate ($Li_xPO_y$, where x+y<=7) is used as anode barrier.

Benefits are achieved over conventional techniques. Depending upon the specific embodiment, one or more of these benefits may be achieved. In a preferred embodiment, the present invention provides a suitable solid state battery structure having specific layer thicknesses, compositions, and materials that provide for unexpected results over conventional battery technology. Preferably, the present battery device has the following characteristics:

At least 1.5 times higher specific/volumetric energy density than a conventional battery;
Less chance to have thermal run away;
No gas generated;
No liquid leakage concerns; and
Having the best usage of capacity of the battery for the targeted applications.

Depending upon the embodiment, one or more of these benefits may be achieved. Of course, there can be other variations, modifications, and alternatives. The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
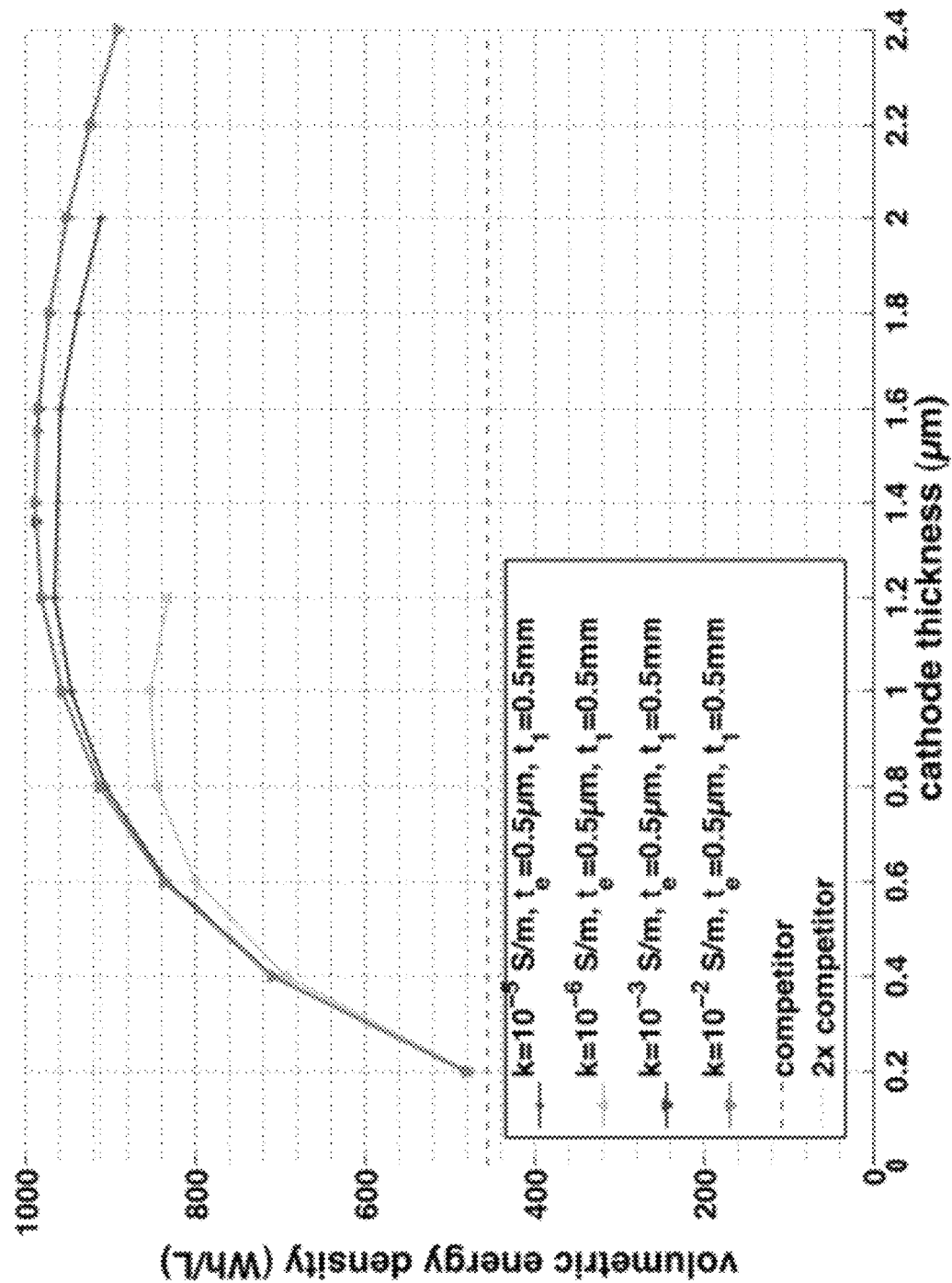
FIG. 1 is a simplified diagram of thin-film solid-state lithium battery performance comparing with iPhone 4 (at Calendar Year of 2011) battery.

According to the present invention, techniques related to the manufacture of electrochemical cells are provided. More particularly, the present invention provides a device and method for fabricating a solid state thin film battery device. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, wherein additional power is provided by a fuel cell, other battery, IC engine or other combustion device, capacitor, solar cell, etc.

As smartphone and portable electronic device functional capabilities increases, the needs to have longevity of a power supply increases as well. A solid-state lithium battery is one promising candidate to supply energy to a smartphone or other similar portable electronic devices. The solid-state lithium battery comprises multiple layers of much smaller unit of lithium electrochemical cells connected in series or in parallel, depending on the application needs. The current drawback of lithium ion batteries is their short cycle longevity, due to the side reaction of dendrite lithium formed inside the cell to short the positive and negative electrode. In extremely severe situations, the side reaction could cause thermal run away and lead to human injury. Hence, the current development trend of lithium ion batteries is to develop a solid electrolyte to replace the liquid electrolyte, such as the polymer electrolyte to reduce the possibility of lithium dendrite growth during the charge and discharge process, or using proprietary separator to inhibit the dendrite short the positive and negative electrodes.

However, thin-film solid-state lithium battery has the advantage of preventing dendrite growth due to the high stiffness of solid-state layers. Also, because of its thin-film spatial dimension, thin-film solid-state lithium batteries also own a high rate capability. The second set if demands for applications, such as smartphone and portable electronic devices, is longer operational times, smaller volume sizes, and lighter weight. These demands require higher energy density per volume and per mass. Conventional commercial lithium ion batteries comprise porous electrodes, and liquid or polymer electrolytes. Because of it porous electrodes and electrolyte features, the conventional commercial lithium ion battery has a limited capability to be further reduced in its size and weight. Also, the conventional lithium ion battery requires several extra materials that do not contribute to the overall energy of the battery, such as the separator and electrolyte, which increase the volume and mass of the whole battery. Furthermore, those dead weight components and volume reduces the specific energy and volumetric energy density of the lithium ion battery. On the other hand, in this invention, we propose thin-film solid-state lithium battery, which utilizes almost all available spatial volume, and also reduces the dead weight and dead volume materials in order to further increase overall energy of the battery.

FIG. 1 is a simplified diagram of thin-film solid-state lithium battery performance comparing with iPhone 4 current battery. Further details regarding this figure are described below in the example sections.

Figure 2A:
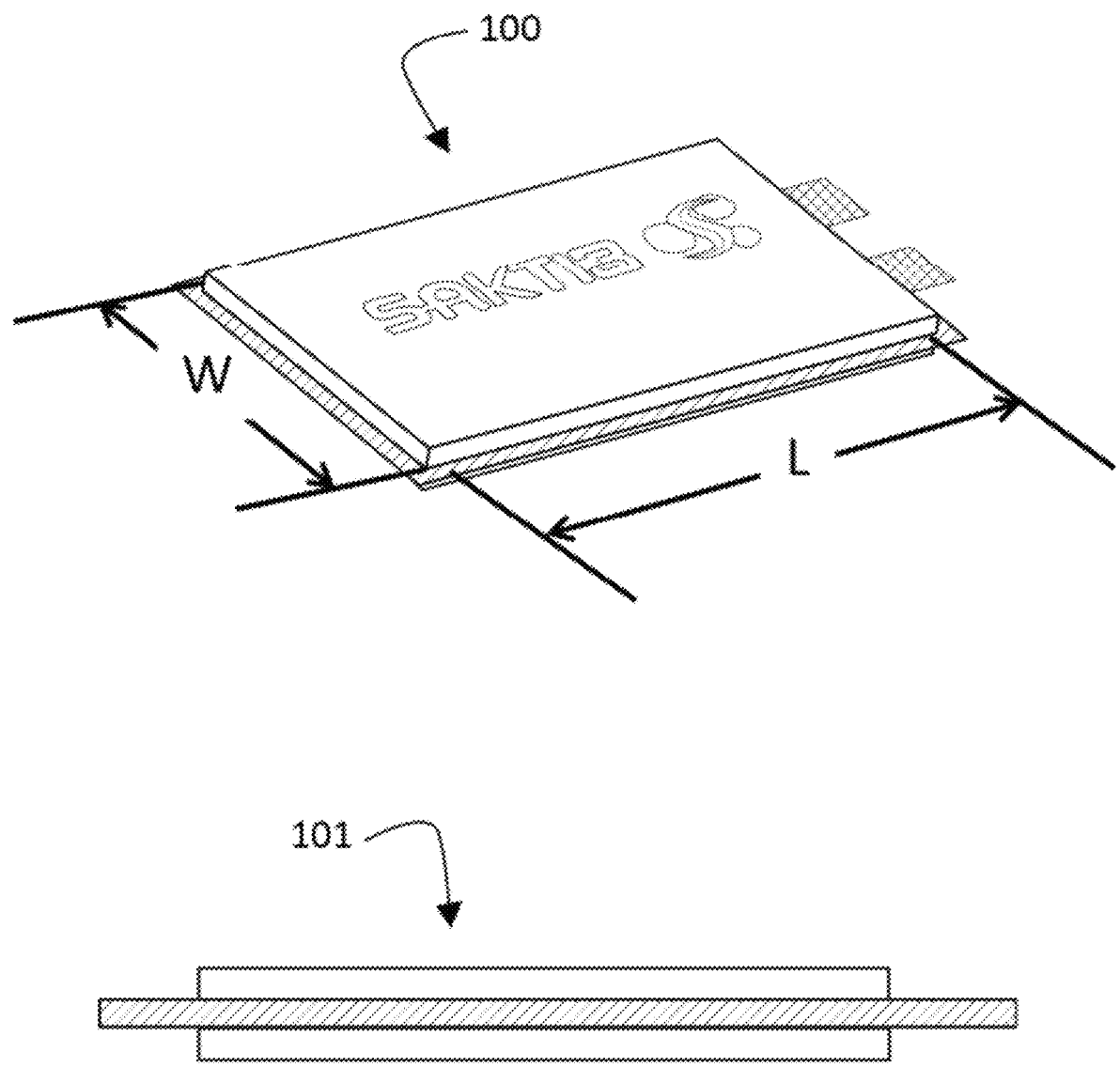
FIG. 2A is a simplified diagram of a thin-film solid-state battery in prismatic pouch package.
Figure 2B:
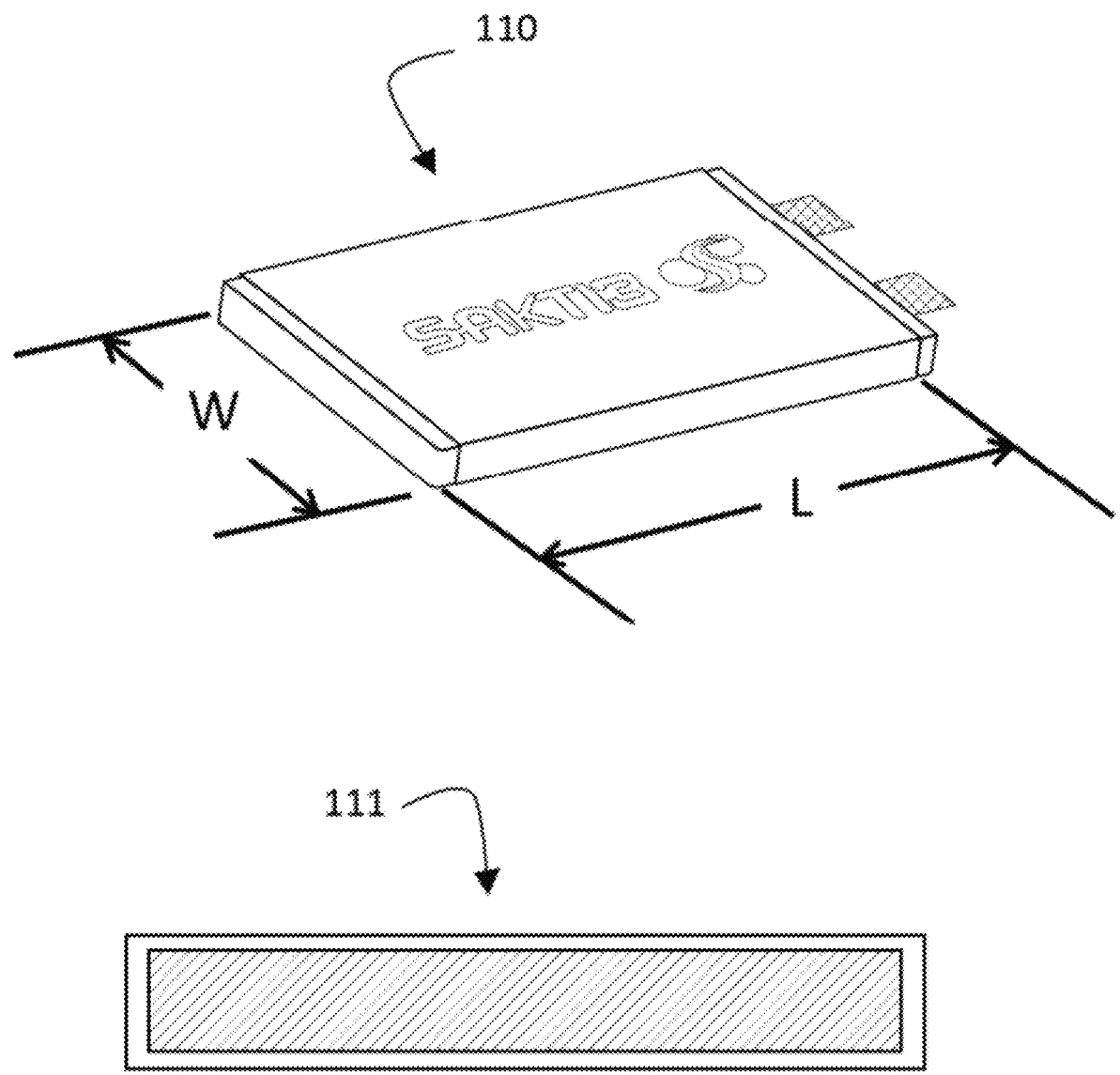
FIG. 2B is a simplified diagram of a thin-film solid-state battery in prismatic metallic package.

FIGS. 2A and 2B are simplified diagrams of thin-film solid-state batteries in prismatic pouch packaging and prismatic metallic packaging, respectively. In a specific embodiment, a monolithically integrated thin-film solid-state lithium battery device comprises multiple layers of lithium electrochemical cells. The lithium electrochemical cell is the smallest unit in the thin-film solid state lithium battery that can provide electron energy and it is characterized by a spatial region of less than 100 centimeter square. In FIGS. 2A and 2B, device 100 and device 110 illustrate two prismatic packaging of Sakti3 thin-film solid-state battery, wherein device 101 and device 111 depict the cross-sectional views of devices 100 and 110, respectively. In FIG. 2A, device 100 is the battery in prismatic pouch packaging. On other hand, device 110 in FIG. 2B is battery packaged in prismatic metallic shell or plastic shell. The cross section area of multiplication of length (L) and width (W) is constrained less than 100 centimeters square, which is a little bigger than the lithium electrochemical cell spatial area.

Figure 3A:
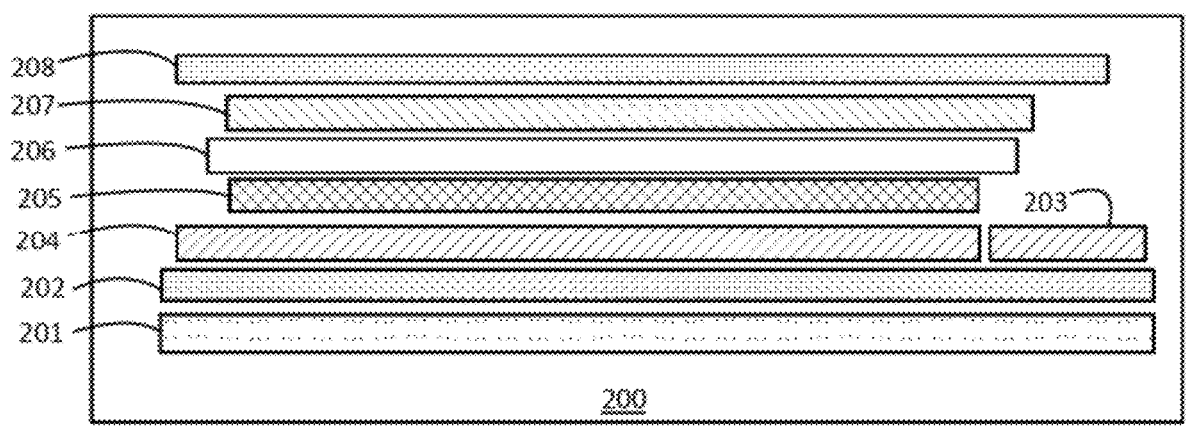
FIG. 3A is a simplified diagram of a cross-sectional view of an electrochemical cell according to an embodiment of the present invention.
Figure 3B:
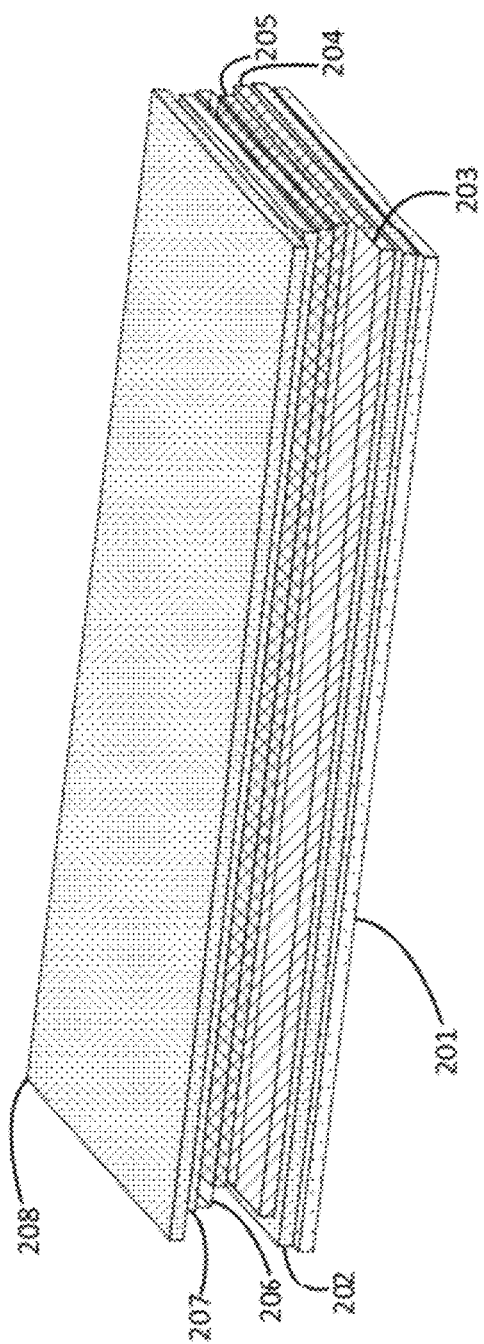
FIG. 3B is a simplified diagram of a perspective view of an electrochemical cell according to an embodiment of the present invention.
Figure 3C:
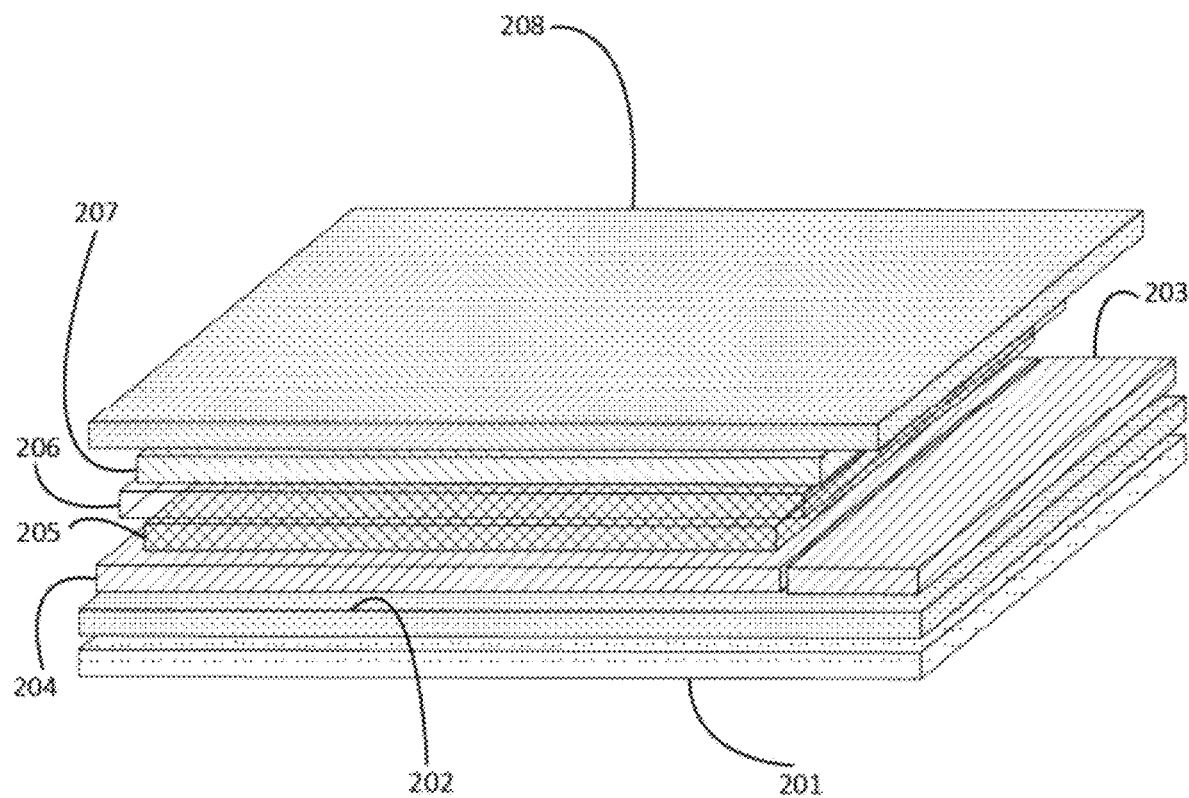
FIG. 3C is a simplified diagram of a perspective view of an electrochemical cell according to an embodiment of the present invention.

This smallest unit in thin-film solid-state lithium batteries is comprised of a substrate 201, cathode barrier 202, cathode current collector 203, cathode 204, electrolyte 205, anode 206, anode current collector 207, anode barrier layer 208 in sequence as illustrated in FIG. 3. The cathode barrier layer 202, cathode current collector 203, cathode 204, electrolyte 205, anode 206, anode current collector 207, and anode barrier 208 are deposited on top of substrate layer 201 by using physical vapor deposition techniques.

Figure 4A:
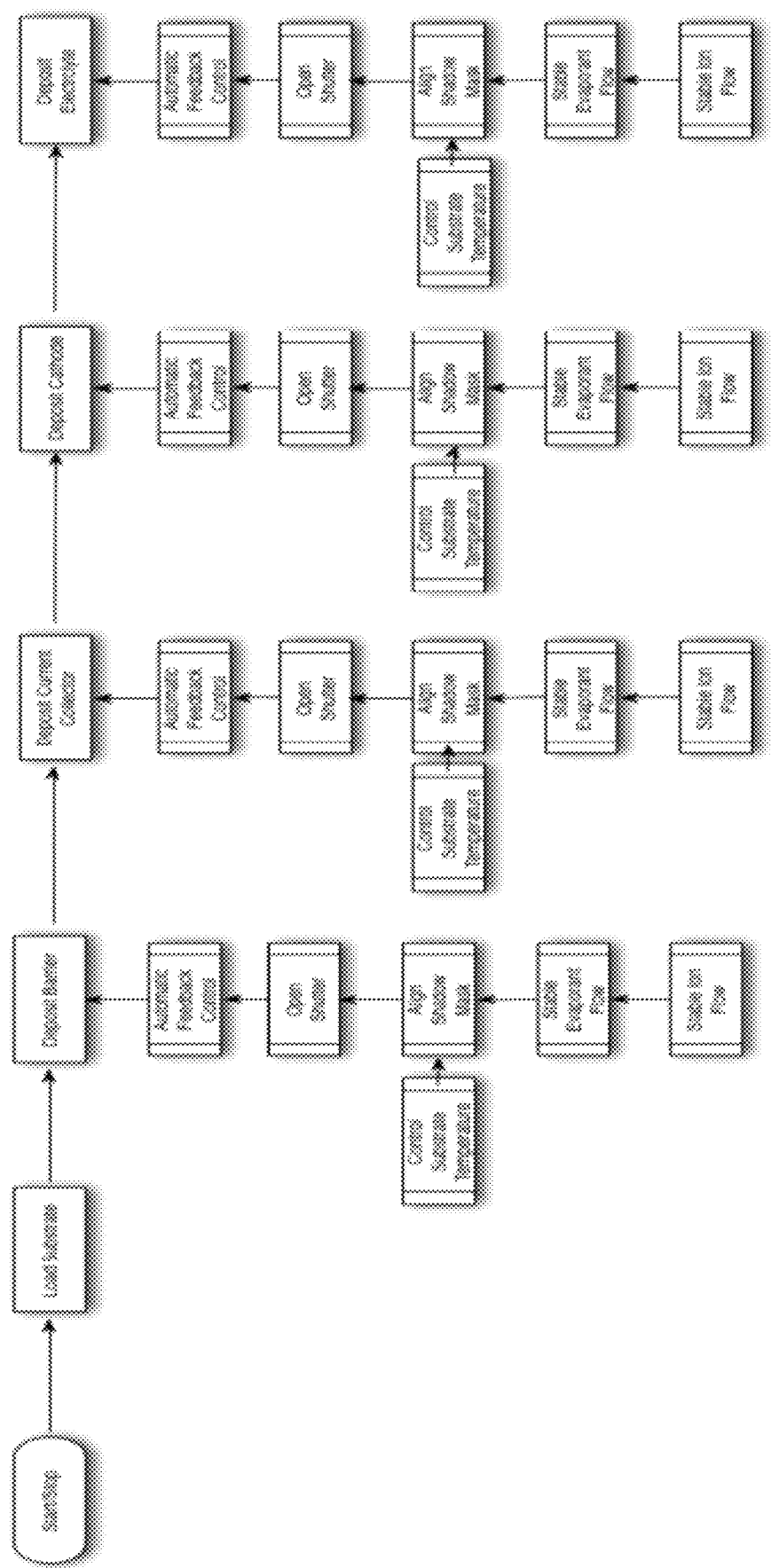
FIG. 4A-4C are simplified process flow diagrams for the thin-film solid state battery device.
Figure 4B:
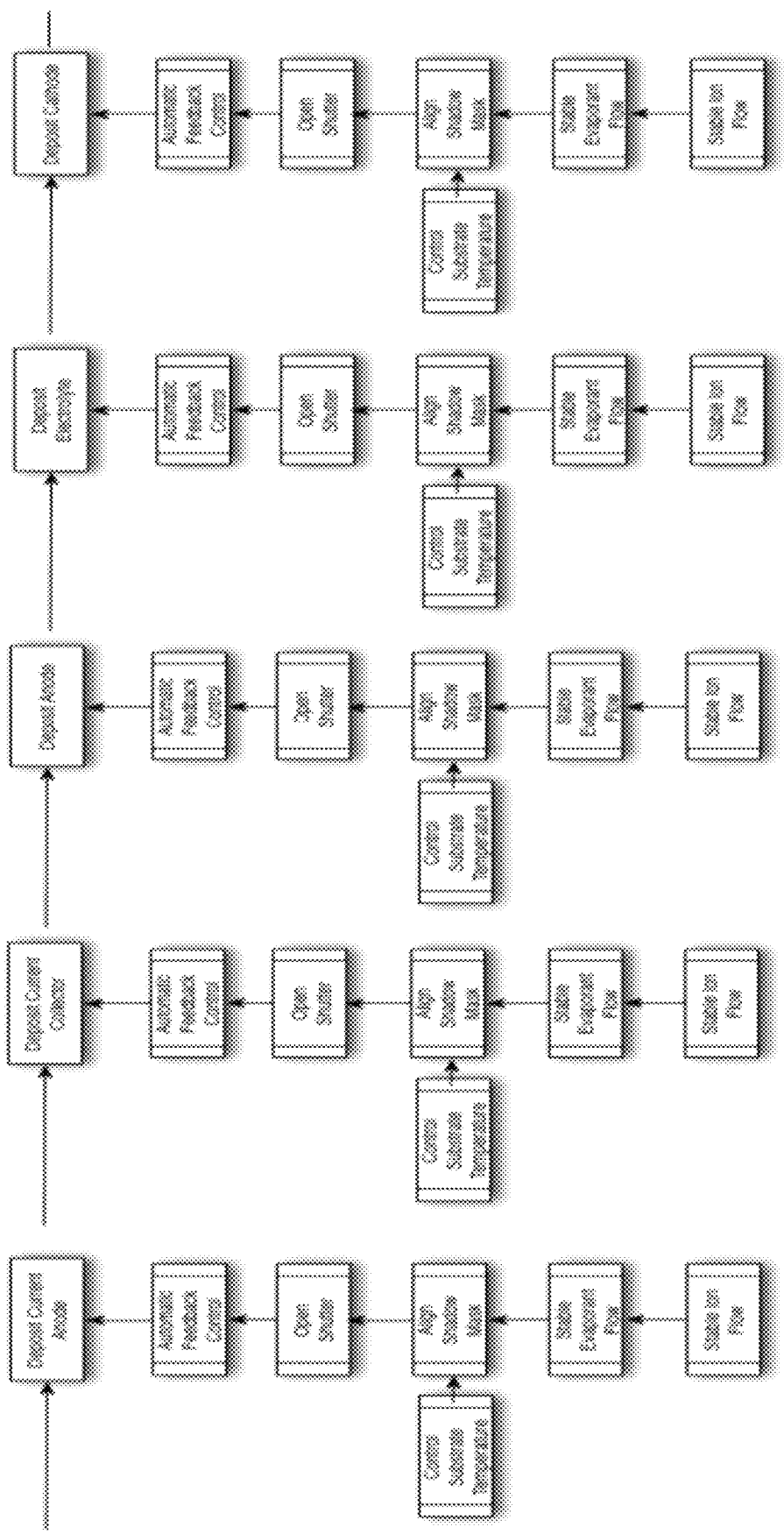
Figure 4C:
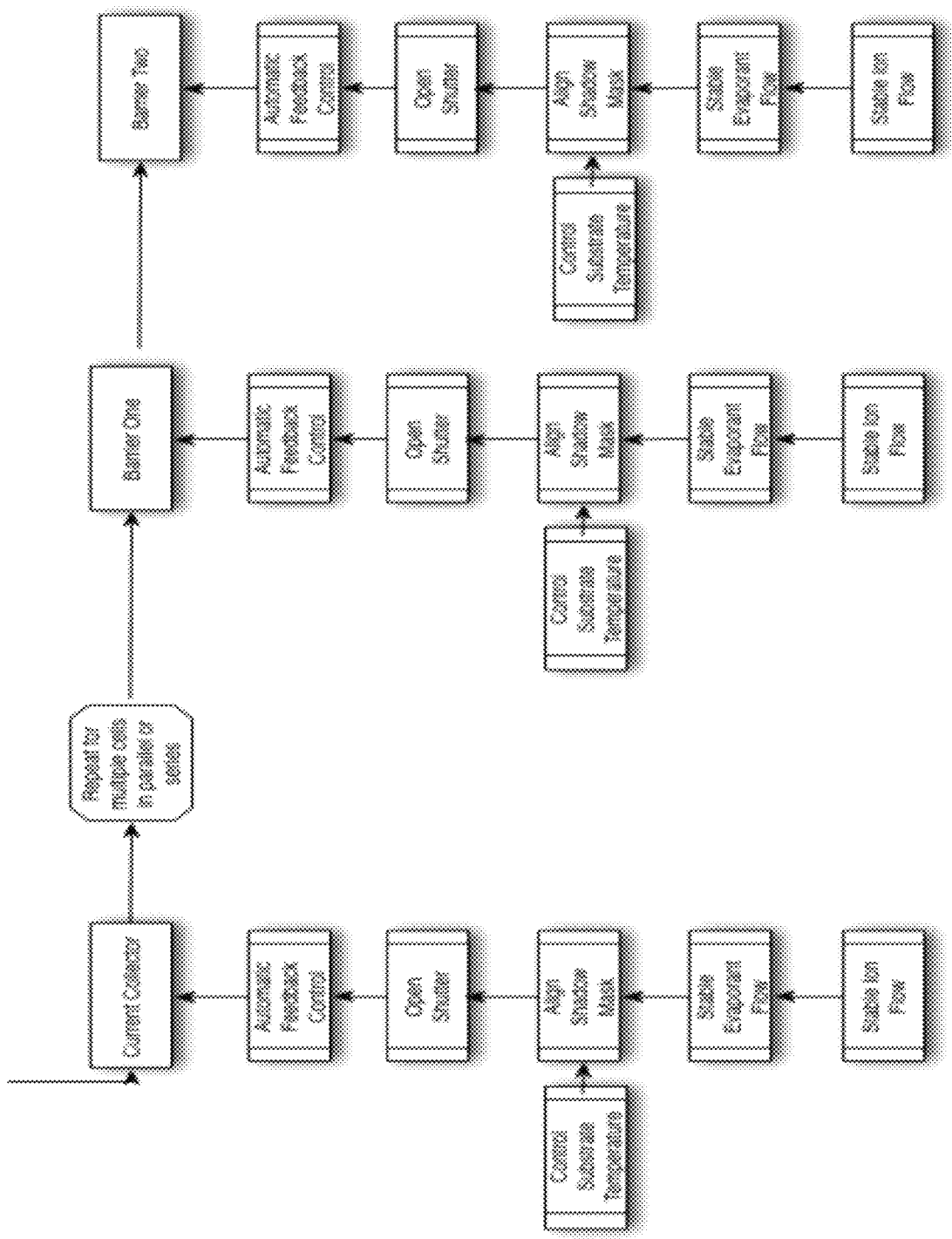

Physical vapor deposition (PVD) processes, often called thin-film processes, are atomistic deposition processes in which materials is vaporized from solid or liquid source material in the form of atoms or molecules, transported in the form of a vapor through a vacuum or low pressure gaseous plasma chamber to the substrate where it condenses to form the film layer material. Here, the term "thin film" is applied to layers that have thicknesses on the order of several micrometers or less. PVD processes can be sued to deposit films of elements and alloys as well as compounds using reactive deposition processes. The resulting films can range from single crystal to amorphous, fully dense to less than fully dense, pure to impure, and thin to thick. In order to maximize the energy density of battery device in a specific embodiment, the mathematical model is used to facilitate this. The process flow diagrams are shown in FIGS. 4A-4C. The mathematical model is used. With these tools, they reduce the trial and error runs in the lab, and it shortens the timeline for a company to commercialize their product. The end results are described detailed in the following.

The substrate layer 201 in the thin-film solid-state electrochemical cell provides the mechanical support for the following layers. Therefore, it must to have the stiffness to sustain the induced weight and stresses due to the following deposited layers latter on. Therefore, typical substrate will be thick and stiff material. However, in this device, we choose thin polymer, especially the polyethylene terephthalate (PET), to be our substrate, in which the substrate thickness is less than 10 microns. Sometimes, in order to prevent the oxygen and moisture from the substrate to diffuse into cathode and cathode current collector, metalized PET, which a very thin layer of copper is coated above the PET, is invented for this purpose, which can reduce the impurity of the cathode and extend its longevity. The thickness of the metalized metal on PET is in the order Angstrom meters.

The cathode barrier layer 202 between the substrate and cathode current collector of the device in a specific embodiment is used to inhibit the reaction of lithium with the moisture inside substrate. Organic materials can be used for this function. An oxide, nitride, or phosphate of metal is preferable for this layer. The metal comes from Groups 4, 10, 11, 13 and 14 of the periodic table. These metal oxides, metal nitrides, or metal phosphates are easy to evaporate and deposit. In a specific embodiment, the thickness of this layer is on the order of 0.1 microns or less. One of promising candidates is the lithium phosphate ($Li_xPO_y$, where $x+y<=7$).

The cathode 203 and anode current collectors 207 in this device are necessary to collect and transport the electron current from the cathode toward the external load. Hence, it needs to have high electrical conductivity, which is in the order of $10^7$ S/m or higher. The cathode and anode current collectors need to be chemical stable at the voltage where they are operated. The cathode current collector needs to be stable at the range of 1.5 to 5 V vs. lithium, and anode current collector needs to be stable at range 0 to 1V versus lithium. Although the current collector is necessary in the electrochemical cell to transport the electrons, it does not contribute the electronic energy of the cell. Hence, it needs to be thin to reduce the volume and mass; however, it cannot be too thin. The potential drop through the film is depending of the thickness of the film as, $$\phi(x=L) = \frac{iL^2}{2\sigma H}$$

where L is the length of the film, H is the thickness of the film, and is the electrical conductivity of the film. Therefore, the thickness cannot be lower than certain value to minimize the potential drop across the film. In a specific embodiment, the thickness of the current collector is between about 0.1 and about 2 microns.

In this device, a cathode electrode material 204 comprised of amorphous or crystalline lithiated transition metal oxide and lithiated transition metal phosphate, wherein the metal comes from Groups 3 to 12 of the periodic table, preferably amorphous lithiated vanadium based oxide with electrical conductivity ranging from $10^{-6}$ to $10^{-2}$ S/m (preferably less than $10^{-3}$ S/m), and ionic diffusivity ranging $1\times10^{-16}$ to $1\times10^{-14}$ $m^2/s$. The vanadium based oxide overlying the electrically conductive layer, the cathode electrode material being characterized with a layer thickness between about 0.2 and about 2 micrometers. The electrical conductivity can be adjusted by the process condition in a specific embodiment.

The solid-state glassy electrolyte 205 of this device comprises amorphous lithiated oxynitride phosphorus with ionic conductivity ranging from $10^{-5}$ to $10^{-4}$ S/m. The ionic conductivity of glassy electrolyte can be tuned by the nitrogen concentration and evaporation process conditions. This glassy electrolyte material configured as an electrolyte overlying the cathode electrode material, the glassy electrolyte material being capable of shuttling lithium ions during a charge process and a discharge process, the glassy electrode material characterized with layer thickness between about 0.1 and about 1 micrometers.

A solid-state layer of negative electrode material configured as an anode 206 in this device is capable of electrochemically insertion lithium into the host lattice or plating of Li-ions during a charge process and a discharge process. This solid-state anode layer having layer thickness between about 0.2 and about 3 micrometers, which has to been about several times of cathode capacity so that it could ensure enough lithium concentration for shuttling back and forth between cathode and anode through electrolyte.

The anode barrier layer 208 overlies the anode current collector in this device is used to inhibit the reaction of lithium with the moisture external air. Organic materials can be used for this function. An oxide, nitride, or phosphate of metal is preferable for this layer. The metal comes from Groups 4, 10, 11, 13 and 14 of the periodic table. These metal oxides, metal nitrides, or metal phosphates are easy to evaporate and deposit. In this invention, the thickness of this layer is in the order of 0.1 microns or less. One of promising candidates is the lithium phosphate ($Li_xPO_y$, where $x+y<=7$).

In a specific embodiment, the electrochemical cells are formed by physical vapor deposition techniques in the sequence of barrier-cathode current collector-cathode-electrolyte-anode-anode current collector-anode barrier repeated more than 100 times, but less than 3000 times, and in the sequence of cathode current collector-cathode-electrolyte-anode-anode current collector-anode-electrolyte-cathode-cathode current collector repeatedly more than 2 times of this sequence on top of substrate layer to reduce the number of layers of substrate and increase the volumetric energy density of the solid-state lithium battery. The flow diagram of physical vapor deposition process is shown in FIGS. 4A-4C. A monolithically integrated thin-film solid-state lithium battery device to supply energy to a mobile communication device, the battery device comprising multiple layers ranging from greater than 100 layers to less than 20,000 layers of lithium electrochemical cells. The lithium electrochemical cells being connected in parallel or in series to conform to a spatial volume. The lithium battery device of a specific embodiment further comprising a substrate and the overlying multiple layers; wherein the overlying multiple layers are free from any intermediary substrate member; wherein the multiple layers are configured to form a plurality of electrochemical cells configured in a parallel arrangement or a serial arrangement using either a self terminated or post terminated connector configuration. The device of a specific embodiment will have an energy density of 500 Watt-hours/liter and greater.

In order to show examples of certain benefits for the embodiments herein, we performed certain experiments in the following examples. Of course, these examples are merely illustrations, which should not unduly limit the scope of the claims herein. One of ordinary skill in the art would recognize other variations, modifications, and alternatives.

Example 1

The iPhone 4 is very popular smartphone in 2010 and 2011. It supports over 425000 applications, commonly called "Apps," which are available to purchase and download. However, it is known that the useable time and longevity of battery are the drawbacks of iPhone 4 when compared with other brand name smartphones. In order to elongate the battery useable time, Apple eliminates the use of Adobe Flash to lower the power consumption.

Figure 5:
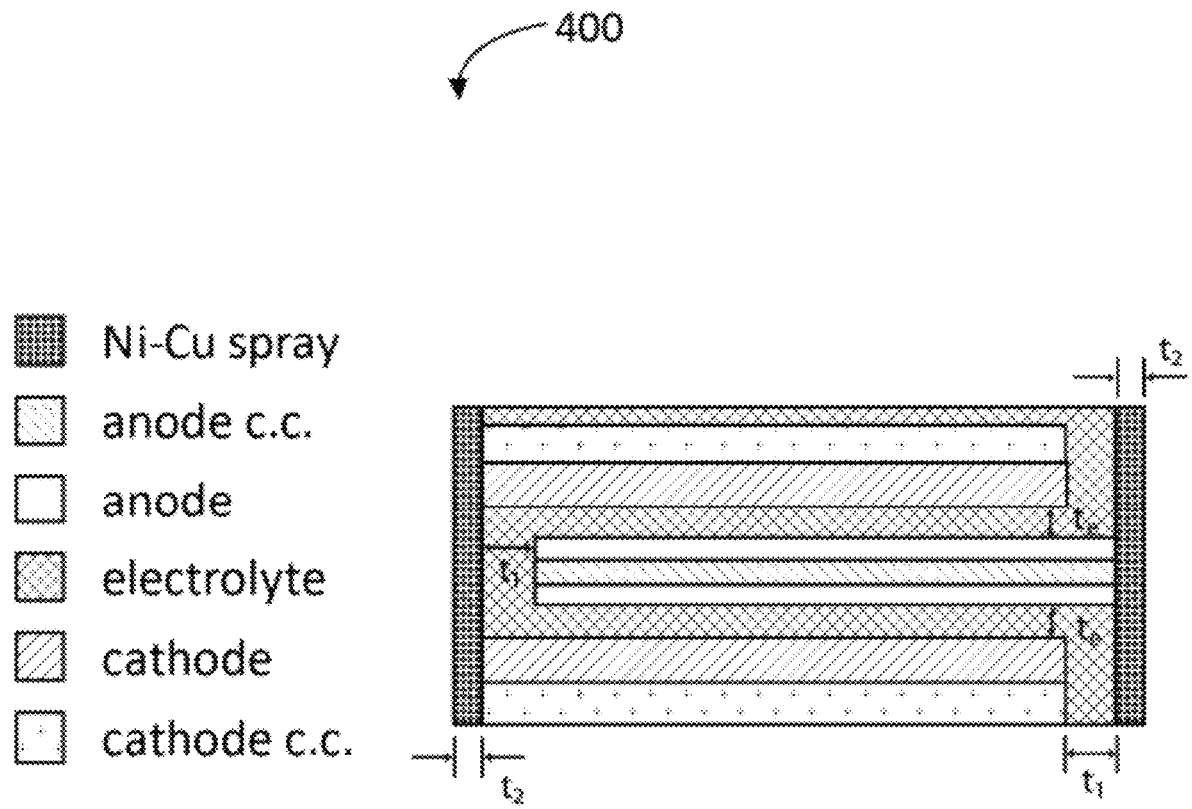
FIG. 5 is a simplified diagram illustrating a cross-section of an electrochemical cell according to an embodiment of the present invention.

In this example, we demonstrate that the currently designed thin-film solid-state lithium battery can outperform the iPhone 4 current battery such that the iPhone 4's capabilities can be further extended. The conventional iPhone 4 battery is labeled with 5.25 Watt-hours (Wh), and its spatial volume is 11.5 centimeter cubic. Hence, its volumetric energy density is about $4.60 \times 10^5$ Wh/m$^3$ (=460 Wh/L). In this example, we have designed a thin-film solid-state battery with the size of 7.2×3.2×0.5 (cm$^3$). A lithium vanadium based oxide was used as the cathode material, lithium based phosphate oxynitride as electrolyte and barrier, lithium metal as the anode, nickel metal as the current collector, and polyethylene terephthalate (PET) as the substrate. The electrochemical cells are stacked in two different ways as shown in FIG. 5, which shows a simplified diagram of a cross-section of an electrochemical cell according to an embodiment of the present invention. In design 400, the cell is stacked in a sequence of cathode current collector-cathode-electrolyte-anode-anode current collector-anode-electrolyte-cathode-cathode current collector-barrier layer, repeatedly for several thousand times overlay on one substrate.

In this example, the assumptions are listed in Table 1. Two design variables are assigned: the cathode thickness ranging from (0.2 to 2 μm), and cathode electrical conductivity ranging from ($10^{-6}$ to $10^{-5}$ S/m) as shown in Table 2.

TABLE 1

| Parameter | Value |
|---|---|
| Cell geometry | 7.2 cm × 3.2 cm × 0.5 cm |
| Cathode stoichiometry | Lithium based vanadium oxide |
| Cathode mass density | 3360 kg/m$^3$ |
| Cathode ionic diffusivity | $2.5 \times 10^{-16}$ m$^2$/s |
| Electrolyte | LIPON |
| Electrolyte mass density | 2500 km/m$^3$ |
| Electrolyte ionic conductivity | $3.3 \times 10^{-4}$ S/m |
| Electrolyte ionic diffusivity | $3.2 \times 10^{-15}$ m$^2$/s |
| Anode stoichiometry | Li |
| Anode mass density | 500 kg/m$^3$ |
| Anode electrical conductivity | $1.17 \times 10^7$ S/m |
| Package material | Polymer |
| Package material mass density | 1400 kg/m$^3$ |
| Package thickness | 100 μm |
| Cathode current collector material | Ni |
| Cathode current collector mass density | 8900 kg/m$^3$ |
| Cathode current collector electrical conductivity | $1.62 \times 10^7$ S/m |
| Anode barrier material | Li$_3$PO$_4$ |
| Anode current collector mass density | 2500 kg/m$^3$ |
| Cathode current collector thickness | 0.1 μm |
| Anode thickness | 1.2 × capacity of cathode |
| t$_2$ (spray) material | Ni |
| t$_2$ (spray) mass density | 8900 kg/m$^3$ |
| t$_2$ (spray) thickness | 100 μm |
| Anode barrier thickness | 0.1 μm |
| t$_2$ thickness | 0.5 mm |

TABLE 2

| Parameter | Ranges |
|---|---|
| Cathode thickness | [0.2, 2.0] μm |
| Cathode electrical conductivity | [$10^{-6}$, $10^{-2}$] S/m |

The results are demonstrated in FIG. 1. The results were derived from mathematical models by varying cathode thickness, and its electronic conductivity, which was our design methodology. The four curves shown in this figure showed that they all have one plateau within the cathode thickness design range (0.2 to 2 μm). More specific, the maximum of the volumetric energy density of these four curves between 0.8 to 1.6 μm cathode thickness. Ranking the penalty impact factors, the electrical conductivity of the cathode thickness is higher than overall substrate thickness; substrate thickness is higher than the electrolyte thickness. The impact of the barrier distance between the electrolyte and Ni—Cu spray is minimal. In this example, it clear demonstrated that reducing the overall thickness of the substrate is important. Once it can be achieve, the overall volumetric energy density will be above 850 Wh/L, which is about 86% increment over current iPhone 4's volumetric energy (460 Wh/L).

Example 2

Figure 6A:
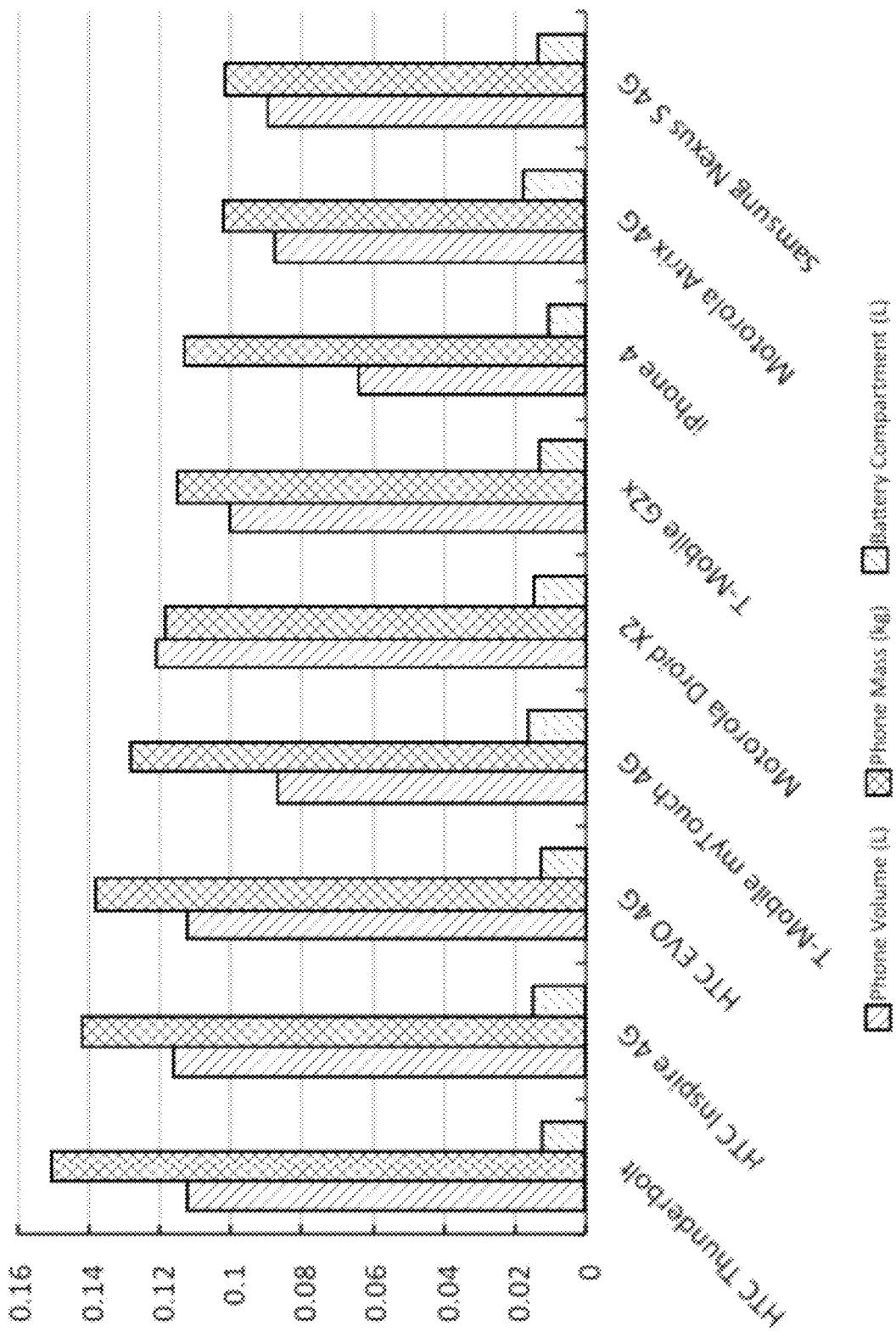
FIG. 6A is a simplified diagram illustrating weight and volume of conventional (e.g., Calendar Year 2011) smartphone.

In this example, we demonstrated the comparison between the battery design in a specific embodiment, with the current existing battery using in the conventional smartphone and mobile computing devices. These conventional smartphone and mobile computing devices are HTC Thunderbolt, HTC Inspire 4G, HTC EVO 4G, T-Mobile myTouch 4G, Motorola Droid X2, T-Mobile G2X, iPhone 4, Motorola Atrix 4G, and Samsung Nexus S 4G. The weight and volume of the batteries used in those device are shown in FIG. 6A, a simplified diagram illustrating weight and volume of conventional (e.g., Calendar Year 2011) smartphone.

Figure 6B:
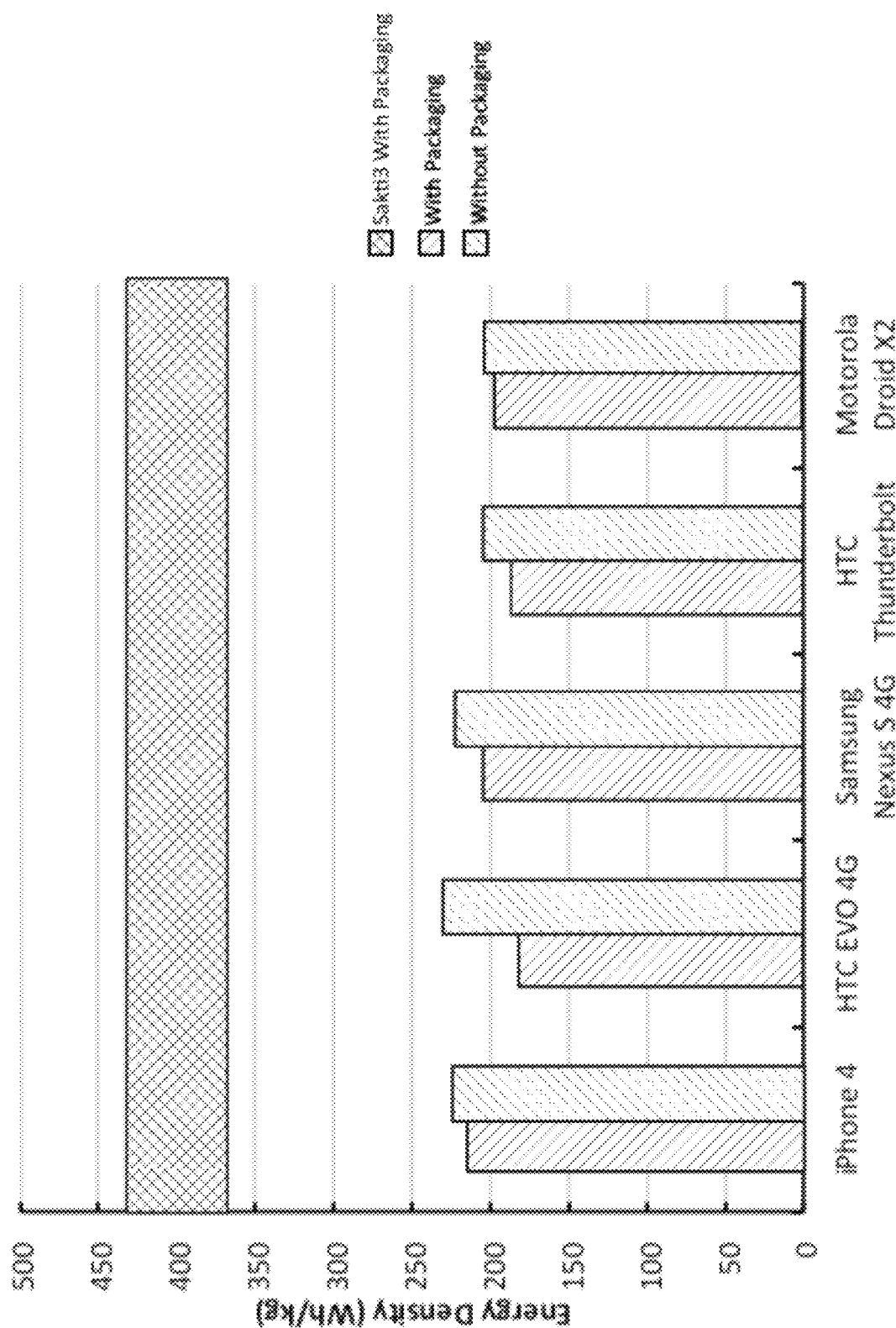
FIG. 6B is a simplified diagram of volumetric energy density of the batteries used in conventional smartphones comparing with the battery device in one of the embodiment.
Figure 6C:
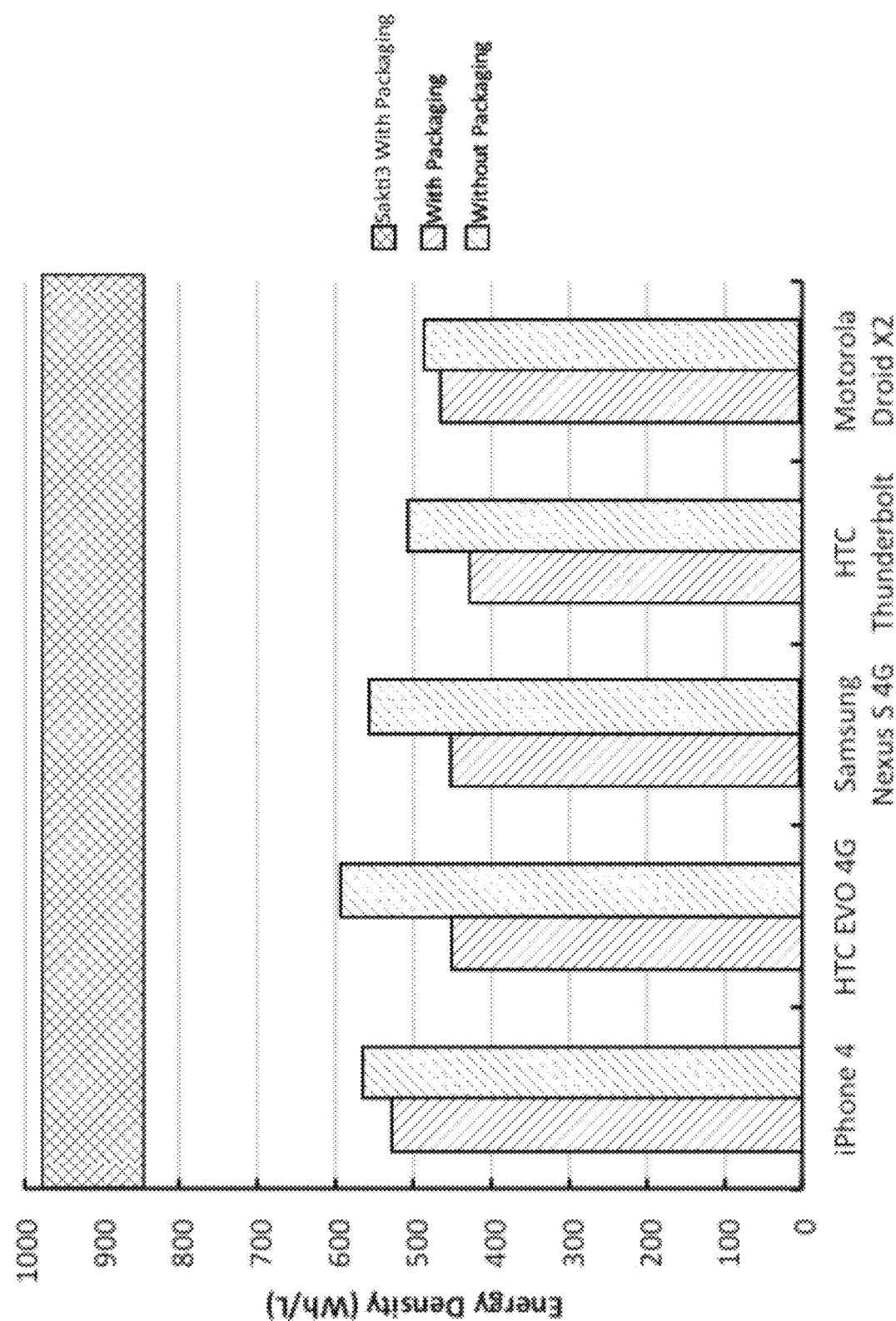
FIG. 6C is a simplified diagram of gravimetric energy density of the batteries used in conventional smartphones comparing with the battery device in one of the embodiment.

In a specific embodiment, the present battery has the volume as the iPhone 4, and its weight ranging from 0.02 to 0.03 kg depending on the design. The design is based on the numerical methods. The smartphones and mobile computing devices are discharged at constant current rate. The volumetric and gravimetric energy densities of these electronic devices are shown in FIGS. 6B and 6C, simplified diagrams of volumetric energy density and gravimetric energy density of the batteries used in conventional smartphones comparing with the battery device in one of the embodiment, respectively. Where the volumetric energy is calculated based on the total output electronic energy from the batteries under the constant current rate divided to the volume and mass of the battery with and without the packaging materials. Clearly, it demonstrated that with the battery device in a specific embodiment is way superior to the tested conventional smartphone and mobile computing devices. In specific energy density, the battery devices in preferred embodiments are about 2 times than the conventional batteries used in the smartphone and mobile computing devices. In the volumetric energy density, the battery device in a preferred embodiment is about 1.8 times than the ones of conventional batteries used in these electronics.

Figure 7:
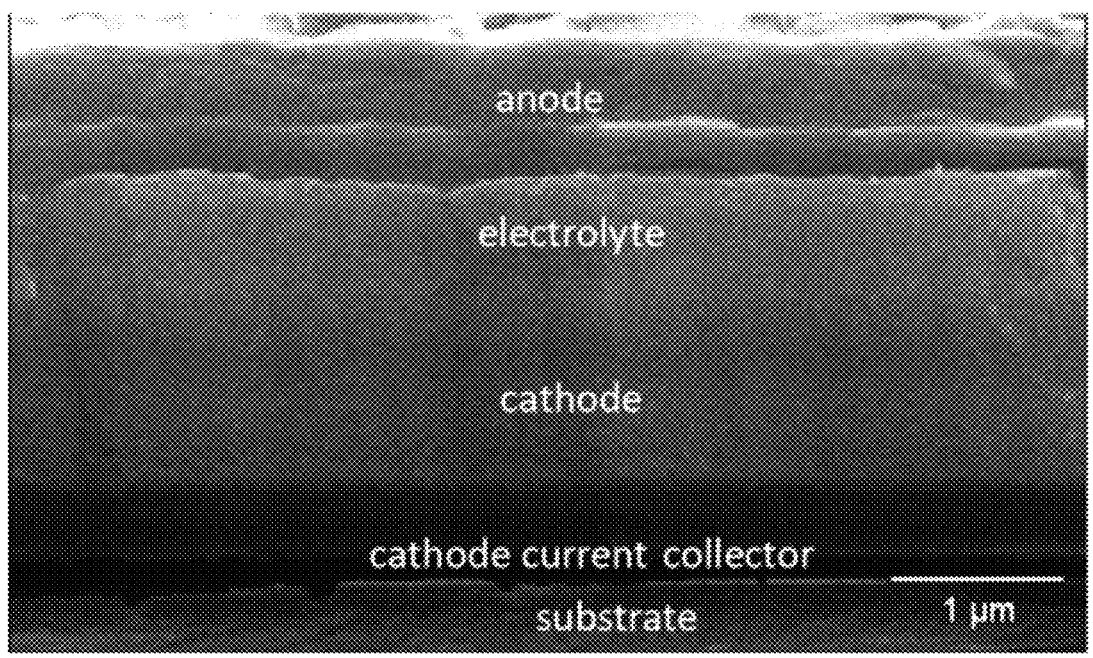
FIG. 7 is a scanning electron microscopy image of the electrochemical cell device described in an embodiment of the present invention.

FIG. 7 is a scanning electron microscopy image of the electrochemical cell device described in an embodiment of the present invention. This image shows the cross-section of the electrochemical cells of one of preferred embodiment under scanning electron microscopic images. With the scanning electron microscopic image, the thickness of the each layer can be easily categorized. As an example, the thickness of cathode, electrolyte, and anode is 1.0, 0.6, and 0.7 microns, respectively.

Figure 8:
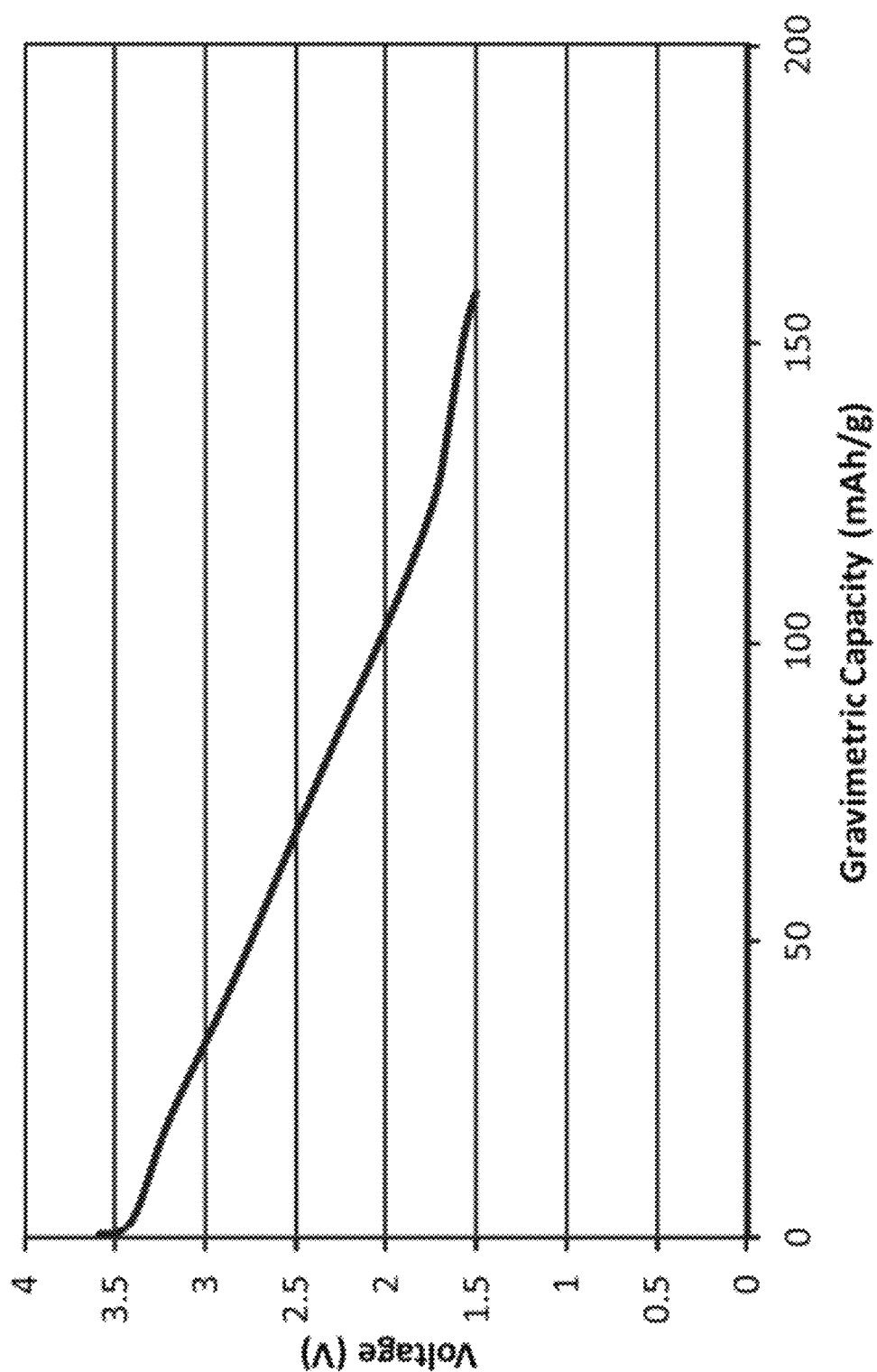
FIG. 8 is a simplified diagram of a cell discharge curve of a battery device according to an embodiment of the present invention.

FIG. 8 is a simplified diagram of a cell discharge curve of a battery device according to an embodiment of the present invention. This graph shows the physical cell discharge curve based on exactly the design in preferred embodiment. The cell is discharged under constant C rate. The curve shows the cell voltage versus the output specific capacity. This curve clearly demonstrates that the present battery device achieve the theoretical capacity 26.8 Ah*2.4 (mole of lithium)/(molecular mass of either the cathode, or anode) =160 Ah/Kg.

While the above is a full description of the specific embodiments, various modifications, alternative constructions and equivalents may be used. As an example, the present device has been described in terms of a prismatic battery cell package. However, it would be appreciated that other form factors (e.g., cylinder, button) can also be used. Therefore, the above description and illustrations should not be taken as limiting the scope of the present invention which is defined by the appended claims.

What is claimed is:

1. A monolithically integrated thin-film solid-state lithium battery device comprising:
   a stacked arrangement of a plurality of layers of lithium electrochemical cells, each of the lithium electrochemical cells having a spatial region of less than 100 square centimeters, the stacked arrangement comprising:
   a substrate having a layer thickness of less than 10 micrometers;
   a first barrier layer formed over the substrate, the first barrier layer having a thickness of less than 0.1 micrometers and configured to inhibit lithium from reacting with moisture from the substrate;
   a cathode current collector formed over the first barrier layer, the cathode current collector having an electrical conductivity of at least $10^7$ S/m and a layer thickness of between about 0.1 and about 2 micrometers;
   a cathode comprising a vanadium based oxide formed over the cathode current collector and having a layer thickness of between about 0.2 and about 2 micrometers;
   a glassy electrolyte material formed over the cathode and having a layer thickness of between about 0.1 and about 1 micrometers;
   an anode formed over the glassy electrolyte material and configured for electrochemical insertion or ion plating and having a layer thickness between about 0.2 and about 3 micrometers;
   an anode current collector formed over the anode and having an electrical conductivity of at least $10^7$ S/m and a layer thickness of between about 0.1 and about 2 micrometers; and
   a second barrier layer formed over the anode current collector, the second barrier layer having a thickness of less than 0.1 micrometers and configured to prevent oxidation of the anode.

2. The device of claim 1, wherein the substrate comprises a copper bearing material; wherein at least one of the thicknesses of electrochemical cells is provided by cathode, electrolyte, anode, and current collectors; and wherein the spatial region of each electrochemical cell is less than 50 centimeters square.

3. The device of claim 1, wherein the substrate comprises a material having a mass density of less than 1500 kilogram per cubic meter.

4. The device of claim 1, wherein the first barrier layer comprises an oxide, a nitride, or a phosphate of a metal in Group 4, 10, 11, 13 or 14 of the periodic table, and wherein the barrier layer material comprises $Li_xPO_y$, where $x+y<=7$.

5. The device of claim 1, wherein the cathode and the anode current collector are made of a conductive metal selected from an element in Group 10, 11, or 13 of the periodic table.

6. The device of claim 1, wherein the cathode materials comprise an amorphous or a crystalline lithiated transition metal oxide or a lithiated transition metal phosphate.

7. The device of claim 1, wherein the glassy electrolyte material comprises amorphous lithiated oxynitride phosphorus with an ionic conductivity of from $10^{-5}$ to $10^{-4}$ S/m.

8. The device of claim 1, wherein the anode comprises amorphous or crystalline lithiated metal/oxides, graphite, lithium, or lithium metal.

9. The device of claim 1, wherein the device is provided in a mobile phone or mobile appliance.

10. A monolithically integrated thin-film solid-state lithium battery device comprising:
    a stacked arrangement of a plurality of layers of lithium electrochemical cells, each of the lithium electrochemical cells having a spatial region of less than 100 square centimeters, the stacked arrangement comprising:
    a substrate having:
    a layer thickness of less than 10 micrometers;
    a first barrier layer formed over the substrate, the first barrier layer having a thickness of less than 0.1 micrometers and configured to inhibit lithium from reacting with moisture from the substrate;
    a cathode current collector formed over the first barrier layer, the cathode current collector having an electrical conductivity of at least $10^7$ S/m and a layer thickness of between about 0.1 and about 2 micrometers;
    a cathode comprising a vanadium based oxide formed over the cathode current collector and having a layer thickness of between about 0.2 and about 2 micrometers;
    a glassy electrolyte material formed over the cathode and having a layer thickness of between about 0.1 and about 1 micrometers;
    an anode formed over the glassy electrolyte material and configured for electrochemical insertion or ion plating and having a layer thickness between about 0.2 and about 3 micrometers;
    an anode current collector formed over the anode and having an electrical conductivity of at least $10^7$ S/m and a layer thickness of between about 0.1 and about 2 micrometers; and
    a second barrier layer formed over the anode current collector, the second barrier layer having a thickness of less than 0.1 micrometers and configured to prevent oxidation of the anode,
    wherein the monolithically integrated thin-film solid-state lithium battery device has an energy density greater than 850 Wh/L.

11. The device of claim 10, wherein the multiple layers of electrochemical cells is provided by physical vapor deposition in a sequence of barrier-cathode current collector-cathode-electrolyte-anode-anode current collector-anode barrier repeated more than 100 times, but less than 3000 times.

12. The device of claim 10, wherein the multiple layers of electrochemical cells is provided by physical vapor deposition in a sequence of cathode current collector-cathode-electrolyte-anode-anode current collector-anode-electrolyte-cathode-cathode current collector repeatedly more than 2 times.

13. The device of claim 10, wherein the substrate comprises a material having a mass density of less than 1500 kilogram per cubic meter.

14. The device of claim 10, wherein the cathode and the anode current collector are made of a conductive metal selected from an element in Group 10, 11, or 13 of the periodic table.

15. The device of claim 10, wherein the glassy electrolyte material comprises amorphous lithiated oxynitride phosphorus with an ionic conductivity ranging from $10^{-5}$ to $10^{-4}$ S/m.

16. A monolithically integrated thin-film solid-state lithium battery device comprising:
- a stacked arrangement of a plurality of layers of lithium electrochemical cells, each of the lithium electrochemical cells having a spatial region of less than 100 square centimeters, the stacked arrangement comprising:
- a substrate having a layer thickness of less than 10 micrometers;
- a first barrier layer formed over the substrate, the first barrier layer having a thickness of less than 0.1 micrometers and configured to inhibit lithium from reacting with moisture from the substrate;
- a cathode current collector formed over the first barrier layer, the cathode current collector having an electrical conductivity of at least $10^7$ S/m and a layer thickness of between about 0.1 and about 2 micrometers;
- a cathode comprising a vanadium based oxide formed over the cathode current collector and having a layer thickness of between about 0.8 and about 1.6 micrometers;
- a glassy electrolyte material formed over the cathode and having a layer thickness of between about 0.1 and about 1 micrometers;
- an anode formed over the glassy electrolyte material and configured for electrochemical insertion or ion plating and having a layer thickness between about 0.2 and about 3 micrometers;
- an anode current collector
  - formed over the anode and having an electrical conductivity of at least $10^7$ S/m and a layer thickness of between about 0.1 and about 2 micrometers; and
  - a second barrier layer formed over the anode current collector, the second barrier layer having a thickness of less than 0.1 micrometers and configured to prevent oxidation of the anode
- wherein the monolithically integrated thin-film solid-state lithium battery device has an energy density of 500 Watt-hours/liter or greater.

17. The device of claim 16, wherein the substrate comprises a material having a mass density of less than 1500 kilogram per cubic meters.

18. The device of claim 16, wherein the cathode and the anode current collector are made of a conductive metal selected from an element in Groups 10, 11, or 13 of the periodic table.

19. The device of claim 16, wherein the glassy electrolyte material comprises amorphous lithiated oxynitride phosphorus with an ionic conductivity ranging from $10^{-5}$ to $10^{-4}$ S/m; and wherein monolithically integrated thin-film solid-state lithium battery device has an energy density is above 850 Wh/L.

20. The device of claim 1, wherein the plurality of layers of lithium electrochemical cells comprises between 100 and 20,000 layers of lithium electrochemical cells.

21. The device of claim 1, wherein the lithium electrochemical cells of the plurality of layers of lithium electrochemical cells are connected in parallel.

22. The device of claim 1, wherein the lithium electrochemical cells of the plurality of layers of lithium electrochemical cells are connected in series.

23. The device of claim 1, wherein the plurality of layers of lithium electrochemical cells comprises post- or self-terminated current collectors.

* * * * *